United States Patent
Ozaki et al.

(10) Patent No.: US 6,827,757 B2
(45) Date of Patent: Dec. 7, 2004

(54) MAGNETITE-IRON BASED COMPOSITE POWDER, MAGNETITE-IRON BASED POWDER MIXTURE, METHOD FOR PRODUCING THE SAME, METHOD FOR REMEDYING POLLUTED SOIL, WATER OR GASES AND ELECTROMAGNETIC WAVE ABSORBER

(75) Inventors: Yukiko Ozaki, Chiba (JP); Satoshi Uenosono, Chiba (JP); Hiroki Nakamaru, Chiba (JP); Yukiko Nakamura, Chiba (JP); Shigeaki Takajo, deceased, late of Chiba (JP); by Sawae Takajo, legal representative, Chiba (JP); Shigeru Unami, Chiba (JP); Shingo Saito, Chiba (JP)

(73) Assignee: JFE Steel Corporation (JP)

( * ) Notice: Subject to any disclaimer, the term of this patent is extended or adjusted under 35 U.S.C. 154(b) by 0 days.

(21) Appl. No.: 10/157,604

(22) Filed: May 29, 2002

(65) Prior Publication Data

US 2003/0116745 A1 Jun. 26, 2003

(30) Foreign Application Priority Data

Nov. 30, 2001 (JP) ........................................ 2001-366521

(51) Int. Cl.$^7$ ................................................ B22F 1/00
(52) U.S. Cl. ........................................................ 75/252
(58) Field of Search ................. 75/252, 348; 252/62.56; 423/633

(56) References Cited

U.S. PATENT DOCUMENTS

| | | | | |
|---|---|---|---|---|
| 4,013,534 A | * | 3/1977 | Ishii et al. ............... | 204/192.2 |
| 4,113,521 A | * | 9/1978 | Bush et al. ............... | 148/287 |
| 4,617,282 A | * | 10/1986 | van der Vleugel et al. ... | 502/66 |
| 4,975,333 A | * | 12/1990 | Johnson et al. ............. | 428/570 |
| 5,186,854 A | * | 2/1993 | Edelstein ................. | 252/62.55 |
| 5,531,922 A | * | 7/1996 | Okinaka et al. ......... | 252/62.56 |
| 5,731,085 A | * | 3/1998 | Hakata et al. ............. | 428/402 |
| 5,874,019 A | * | 2/1999 | Uchida et al. ........... | 252/62.59 |

FOREIGN PATENT DOCUMENTS

| | | |
|---|---|---|
| JP | 56055503 A | 5/1981 |
| JP | 61073303 A | 4/1986 |
| JP | 61216306 A | 9/1986 |
| JP | 61238901 A | 10/1986 |
| JP | 62030801 A | 2/1987 |
| JP | 2001-198567 | 7/2001 |

* cited by examiner

Primary Examiner—Ngoclan T. Mai
(74) Attorney, Agent, or Firm—Piper Rudnick LLP

(57) ABSTRACT

A magnetite-iron based composite powder includes magnetite with a ratio of X-ray diffraction intensity to that of α-Fe of about 0.001 to about 50 and has an average primary particle size of about 0.1 to about 10 μm. The composite powder can highly dehalogenate organic halogen compounds and exhibits satisfactory absorption power of high frequency electromagnetic waves after molding. An ultrafine nonferrous inorganic compound powder may adhere to the surface of the composite powder, or at least the composite powder may adhere to the surfaces of small particles of a nonferrous inorganic compound to thereby yield a composite powder composition. The composite powder can be produced by partial reduction of a material powder containing a hematite based powder or by complete reduction and subsequent partial oxidation of the material powder.

14 Claims, 1 Drawing Sheet

MAGNETITE-IRON BASED COMPOSITE POWDER, MAGNETITE-IRON BASED POWDER MIXTURE, METHOD FOR PRODUCING THE SAME, METHOD FOR REMEDYING POLLUTED SOIL, WATER OR GASES AND ELECTROMAGNETIC WAVE ABSORBER

BACKGROUND

1. Field of the Invention

This invention relates to a magnetite-iron based composite powder, a magnetite-iron based composite powder mixture and a method for producing the magnetite-iron based composite powder mixture. The invention also relates to a method for remedying polluted soil, water or gases with the aid of the reducing activity of the magnetite-iron based composite powder and to an electromagnetic wave absorber and other magnetic material using the magnetism of the magnetite-iron based composite powder.

2. Description of the Related Art

Iron powders are used as materials for powder metallurgy for fabricating mechanical parts and magnetic parts such as magnetic powder cores and electromagnetic wave absorbers. In addition, iron powder is used as a powder in catalysts, food additives, antioxidants and carriers for copier toner and for remedying soil and other media. Conventional techniques and problems thereof will be illustrated below specifically regarding methods for remedying soil and other media using a fine iron powder as a reducing agent and electromagnetic wave absorbers using the magnetic properties of the iron powder.

Remediation of Soil and Other Media Using Iron Powder

Methods for remedying soil or groundwater polluted by an organic halogen compound can roughly be classified as (1) a method in which polluted soil or groundwater is decomposed in situ (an in situ decomposition method), (2) a method for treating gases in the polluted soil or polluted groundwater after pumping from the ground (treatment after in situ extraction), and (3) a method for treating the polluted soil after excavation (excavation treatment).

Methods using an iron powder as a reducing agent for decontamination of harmful organic halogen compounds by dehalogenation have been proposed. For example, PCT Japanese Translation Patent Publication No. 5-501520 and Japanese Unexamined Patent Application Publications No. 10-263522 each propose a method for remedying soil and soil moisture by forming a dispersed iron powder layer in the soil followed by bringing groundwater into contact with the layer to thereby decompose organic halogen compounds. Japanese Unexamined Patent Application Publication No. 11-235577 also proposes a method for remedying soil by adding iron powder to and mixing with the soil (excavated or not) to thereby decompose organic chlorine compounds.

The iron powder used in the former method (PCT Japanese Translation Patent Publication No. 5-501520 and Japanese Unexamined Patent Application Publications No. 10-263522) is, for example, scrap iron produced in the cutting process of iron. It is hard to control the composition and structure of the iron powder to be suitable as a reducing agent for organic halogen compounds. As a result, the iron powder exhibits insufficient effects. In addition, the former two publications mention that iron oxides are formed on the surfaces of iron particles by reaction with oxygen in the soil to thereby deteriorate reduction power of the iron powder. As a countermeasure to this problem, the publications also propose deoxygenation of soil in the vicinity of the iron powder by allowing a reducing substance to disperse in the soil. This means that the iron powder used in this method does not have sufficient durability in its reduction power.

The latter method (Japanese Unexamined Patent Application Publication No. 11-235577) proposes an iron powder containing equal to or more than 0.1% by weight of carbon and having a specific surface area of equal to or more than 500 $cm^2/g$. This iron powder comprises sponge like particles having a pearlite texture as a structure with a particle size distribution that allows equal to or more than 50% by weight of the total powder to pass through a 150 $\mu$m sieve. However, even this configuration may not effectively dehalogenate such organic halogen compounds.

Japanese Unexamined Patent Application Publication No. 12-80401 proposes an iron powder containing 0.020 to 0.5% by weight of phosphorus, sulfur or boron as iron powder that can effectively remove phosphor compounds in drainage. The iron powder contains specific trace elements and the objective effect thereof is to accelerate decontamination of phosphor in the drainage by increasing the dissolving speed of the iron into the drainage. Specifically, according to the mechanism of the aforementioned iron powder, a compound which hardly dissolves and has a low solubility product constant, such as iron phosphate, is formed between the dissolved iron and phosphor in the drainage to remove phosphor from the drainage by precipitation. This technology is fundamentally different from the technology for reductive decomposition of harmful substances on the surface of iron according to this invention.

Japanese Unexamined Patent Application Publication No. 2000-5740 proposes an iron powder containing 0.1 to 10% by weight of copper as an iron powder that can efficiently remove organic chlorine compounds from soil and/or groundwater. However, copper itself is a harmful metal with a danger of causing secondary pollution.

In addition, all of the aforementioned iron powders mainly contain iron having a valency of zero ($Fe^0$) and thereby exhibit insufficient decomposition power for organic halogen compounds.

An iron powder having an average primary particle size of less than 1 $\mu$m has not been readily available, and those having a large average primary particle size of about 80 $\mu$m have been used for the above application. However, such iron powders having a large particle size cannot sufficiently be dispersed into the soil or groundwater, have a small specific surface area and thereby cannot sufficiently decompose the organic halogen compounds with efficiency. Even if such fine iron powder particles can be obtained, their reduction power may be rapidly consumed.

Application of Iron Powder to Magnetic Materials

A carbonyl ion powder obtained by reduction of carbonyl iron, and an acicular iron powder obtained by reduction of goethite iron (acicular iron oxide) are widely used as magnetic materials for use in electronic equipment and communication equipment. However, a demand has been made on magnetic materials that can exhibit their functions in the high frequency regions as a result of recent advances in electronic and communication equipment.

The carbonyl iron powder comprises relatively large particles with a particle size of about several micrometers and its permeability decreases with increasing frequency. The carbonyl iron powder cannot, therefore, be used in a noise filter or an electromagnetic wave absorber in the high frequency regions with a frequency on the order of gigahertz (Ghz).

The acicular iron powder comprises relatively small particles with a particle size of about 0.1 $\mu$m, but such constitutive small particles easily aggregate to thereby form an aggregate having a relatively large particle size. Accordingly, the acicular iron powder is also limited in its application as in the carbonyl iron powder.

In addition, the material carbonyl iron and goethite iron cannot stably be manufactured in a high volume and are expensive, thereby causing increased manufacturing costs.

As such an electromagnetic wave absorber for use in the high frequency regions on the order of gigahertz, a sheet prepared by molding a mixture of a flat powder and a resin is used (e.g., Yasuo Hashimoto: "Ceramics" vol. 35, No. 10 (2000), p. 857–862). The flat powder used herein is prepared by processing a Fe—Si alloy powder, sendust powder or stainless steel powder into a flat powder. However, such flat powders require expensive material powder and expensive treatments for pressing the material powders, thereby causing increased manufacturing costs of the product electromagnetic wave absorber.

Japanese Unexamined Patent Application Publication No. 1-136910 proposes a method of manufacturing a reduced iron including fewer impurities and oxide films by reducing an iron oxide obtained from a pickling device for hoop steel. However, fine particles of the resulting pure iron with a particle size of from 0.1 to 3.0 µm are immediately oxidized in the air and thereby undergo self-combustion due to oxidation heat.

SUMMARY OF THE INVENTION
Remediation of Soil and Other Media Using Iron Powder Polluted groundwater may bring about far more crucial damage over surface drainage, since identification of pollution sources is usually difficult in polluted groundwater as compared to polluted surface drainage. Accordingly, prompt decontamination of polluted groundwater is urgently needed. Durability of the activity of the iron powder as a reducing agent is also strongly required for using the iron powder because the iron powder cannot frequently be replaced. The organic halogen compounds may also be present as a gas in the polluted soil and air different from the organic halogen compounds in the drainage and groundwater. Therefore, it is advantageous to establish a method for efficiently decontaminating organic halogen compounds in the gas for remediation of the polluted soil and air. Accordingly, it would be advantageous to provide a method for rapidly decomposing the organic halogen compounds, a fine composite iron powder suitable for decomposition, and a method for producing the composite iron powder.

Application of Iron Powder to Magnetic Materials

It would also be advantageous to provide a composite magnetic iron powder that is a low-cost magnetic material, can exhibit its functions in the high frequency regions and is not oxidized to generate heat even in air, a method for producing the same, and an electromagnetic wave absorber using the composite magnetic iron powder.

We have discovered that reduction of an iron oxide can yield a composite iron powder including a different component and a different texture from conventional fine iron powders and that the resulting composite iron powder has advantageous properties. Specifically, this invention provides, in a first aspect, a magnetite-iron based composite powder including magnetite and iron and having an average primary particle size of from about 0.01 to about 10 µm.

Preferably, the ratio of the maximum diffraction intensity of the magnetite to that of —Fe in X-ray diffraction is from about 0.001 to about 50. The magnetite-iron based composite powder preferably contains at least one component selected from the group consisting of nickel, cobalt, chromium, manganese and copper, of which nickel is typically preferred. The magnetite-iron based composite powder according to the first aspect of the invention is also briefly referred to as "composite powder".

In a second aspect, the invention provides a magnetite-iron based composite powder mixture including the magnetite-iron based composite powder and a nonferrous inorganic compound powder. The term "nonferrous inorganic compound" as used herein also includes nonferrous pure elements, but does not exclude inclusion of elemental iron in the nonferrous inorganic compound in an amount as much as that of impurities (less than or equal to about 1%).

Preferably, the nonferrous inorganic compound powder has average primary particle size of less than or equal to about 0.1 µm and adheres to a surface of the magnetite-iron based composite powder. In this configuration, the average primary particle size of the nonferrous inorganic compound powder should be smaller than that of the magnetite-iron based composite powder.

Alternatively, the magnetite-iron based composite powder preferably adheres to the surface of the nonferrous inorganic compound powder having an average primary particle size of equal to or more than about 1 µm and less than or equal to about 100 µm. In this configuration, the average primary particle size of the nonferrous inorganic compound powder should be greater than that of the magnetite-iron based composite powder.

Further alternatively, the magnetite-iron based composite powder and a nonferrous inorganic compound powder having an average primary particle size of less than or equal to about 0.1 µm (a first nonferrous inorganic compound powder) adhere to a surface of a nonferrous inorganic compound powder having an average primary particle size of equal to or more than about 1 µm and less than or equal to about 100 µm (a second nonferrous inorganic compound powder). In this configuration, the average primary particle sizes of the first nonferrous inorganic compound powder and the magnetite-iron based composite powder are smaller than that of the second nonferrous inorganic compound powder. The magnetite-iron based composite powder mixture according to the second aspect of the invention is also briefly referred to as "composite powder mixture".

Preferred magnetite-iron based composite powders for use in the magnetite-iron based composite powder mixture are the same as in the magnetite-iron based composite powder according to the first aspect of the invention.

Preferably, the nonferrous inorganic compound powder is a silicate and/or an inorganic compound including carbon (inclusive of allotropes of carbon). More preferably, the nonferrous inorganic compound powder having an average primary particle size of less than or equal to about 0.1 µm is a silicate and/or an inorganic compound including carbon and having an average primary particle size of less than or equal to about 0.1 µm, and the nonferrous inorganic compound powder having an average primary particle size of equal to or more than about 1 µm and less than or equal to about 100 µm is a silicate and/or graphite having an average primary particle size of equal to or more than about 1 µm and less than or equal to about 100 µm.

The nonferrous inorganic compound powder having an average primary particle size of less than or equal to about 0.1 µm may be referred to as an "ultrafine powder", and the nonferrous inorganic compound powder having an average primary particle size of equal to or more than about 1 µm and less than or equal to about 100 µm may be referred to as "small particles".

When special emphasis is placed on the magnetic properties of the composite powder mixture, the nonferrous inorganic compound powder (inclusive of the ultrafine powder and small particles) is a dielectric powder having a relative dielectric constant of more than about 2.0.

The dielectric powder preferably has a standard Gibbs free energy of formation less than that of hematite.

Preferably, the dielectric powder is at least one material selected from the group consisting of a titanium oxide powder, a silicon oxide powder and an aluminium oxide powder.

In a third aspect, the invention provides a method for producing a magnetite-iron based composite powder. The method includes the steps of heating and thereby reducing a hematite based powder having an average primary particle size of from about 0.01 to about 10 $\mu$m in a reducing gas, and stopping reduction of the powder at about midstream of reduction to thereby yield a partially reduced powder as a composite powder comprising magnetite and iron.

In a fourth aspect, the invention provides another method for producing a magnetite-iron composite powder mixture. This method includes the steps of heating and thereby reducing a hematite based powder having an average primary particle size of from about 0.01 to about 10 $\mu$m in a reducing gas in the presence of a nonferrous inorganic compound powder, and stopping reduction of the powder at about midstream of reduction to thereby yield a partially reduced powder as a composite powder comprising magnetite and iron.

The phrase "stopping reduction of the powder at about midstream of reduction" means that the reduction operation of the hematite based powder is stopped during formation of water formed as a result of reduction.

The invention further provides, in a fifth aspect, another method for producing a magnetite-iron composite powder. The method includes the steps of heating a hematite based powder having an average primary particle size of from about 0.01 to about 10 $\mu$m in a reducing gas to reduce the powder substantially completely, and oxidizing a surface of the substantially completely reduced powder with an oxygen-containing gas to thereby yield a composite powder comprising magnetite and iron.

The invention provides, in a sixth aspect, another method for producing a magnetite-iron composite powder mixture. The method includes the steps of heating a hematite based powder having an average primary particle size of from about 0.01 to about 10 $\mu$m in a reducing gas in the presence of a nonferrous inorganic compound powder to reduce the powder substantially completely, and oxidizing a surface of the substantially completely reduced powder with an oxygen-containing gas to thereby yield a composite powder comprising magnetite and iron.

In a seventh aspect, the invention provides yet another method for producing a magnetite-iron based composite powder. The method includes the steps of heating and thereby reducing a hematite based powder having an average primary particle size of from about 0.01 to about 10 $\mu$m in a reducing gas, stopping reduction of the powder at about midstream of reduction to yield a partially reduced powder, and oxidizing a surface of the partially reduced powder with an oxygen-containing gas to thereby yield a composite powder comprising magnetite and iron.

In addition, the invention provides, in an eighth aspect, yet another method for producing a magnetite-iron composite powder mixture. The method includes the steps of heating and thereby reducing a hematite based powder having an average primary particle size of from about 0.01 to about 10 $\mu$m in a reducing gas in the presence of a nonferrous inorganic compound powder, stopping reduction of the powder at about midstream of reduction to yield a partially reduced powder, and oxidizing a surface of the partially reduced powder with an oxygen-containing gas to thereby yield a composite powder comprising magnetite and iron.

According to the third through eighth aspects of the invention, the ratio of the maximum diffraction intensity of the magnetite to that of $\alpha$-Fe in X-ray diffraction is preferably from about 0.001 to about 50 as in the first and second aspects of the invention. The reducing gas is preferably hydrogen gas, carbon monoxide gas or a gaseous mixture thereof. Further, the reducing gas may comprise a gas of hydrocarbon such as methane or ethane.

The magnetite-iron based composite powder mentioned in the third to sixth aspects of the invention preferably contains at least one component selected from the group consisting of nickel, cobalt, chromium, manganese and copper, of which nickel is typically preferred, as in the first and second aspects of the invention.

In the above methods according to the fourth, sixth and eighth aspects of the invention, the nonferrous inorganic compound powder preferably includes a silicate and/or an inorganic compound including carbon.

In addition, the nonferrous inorganic compound powder is preferably a nonferrous inorganic compound powder having an average primary particle size of less than or equal to about 0.1 $\mu$m and/or a nonferrous inorganic compound powder having an average primary particle size of equal to or more than about 1 $\mu$m and less than or equal to about 100 $\mu$m. More preferably, the nonferrous inorganic compound powder having an average primary particle size of less than or equal to about 0.1 $\mu$m includes a silicate and/or an inorganic compound including carbon, and the nonferrous inorganic compound powder having an average primary particle size of equal to or more than about 1 $\mu$m and less than or equal to about 100 $\mu$m includes a silicate and/or an inorganic compound including carbon.

The nonferrous inorganic compound powder is preferably a dielectric powder having a relative dielectric constant of more than about 2.0.

The dielectric mentioned above preferably has a standard Gibbs free energy of formation less than that of the iron oxide.

At least one of a titanium oxide powder, a silicon oxide powder and an aluminium oxide powder is preferably used as the dielectric powder.

The material hematite powder preferably contains at least one component selected from the group consisting of nickel, cobalt, chromium, manganese and copper, of which nickel is typically preferred.

The reducing gas is preferably hydrogen gas or carbon monoxide gas.

The invention provides, in a ninth aspect, a method for remedying polluted soil, water or gases. The method includes the steps of bringing the magnetite-iron based composite powder according to the first aspect or the magnetite-iron based composite powder mixture according to the second aspect of the invention into contact with at least one of soil, water or a gas polluted with an organic halogen compound, and thereby decomposing the organic halogen compound.

In addition and advantageously, the invention provides, in a tenth aspect, an electromagnetic wave absorber including a molded mixture of the magnetite-iron based composite powder according to the first aspect or the magnetite-iron based composite powder mixture according to the second aspect with a rubber and/or a resin.

The resin is preferably a thermosetting resin or a thermoplastic resin.

The composite powder (mixture) of the invention has a larger specific surface area and more active sites than conventional iron powders for use in dehalogenation of organic halogen compounds. Accordingly, the composite powder (mixture) can rapidly dehalogenate the organic halogen compounds, keep its activity over a long time and is, therefore, suitable for remediation of polluted soil, polluted groundwater or polluted air. The composite powder (mixture) can also be used as a magnetic material for use in high frequency regions, and the resulting magnetic material obtained by molding the composite powder (mixture) can keep its satisfactory permeability and absorption capability of electromagnetic waves in the high frequency regions.

BRIEF DESCRIPTION OF THE DRAWING

The single FIGURE (FIG. 1) is a schematic perspective view showing a cylindrical vessel filled with hematite and a mixture of a coke powder and a calcium carbonate powder according to an aspect of the production method according to the invention.

DETAILED DESCRIPTION

Figure 1:
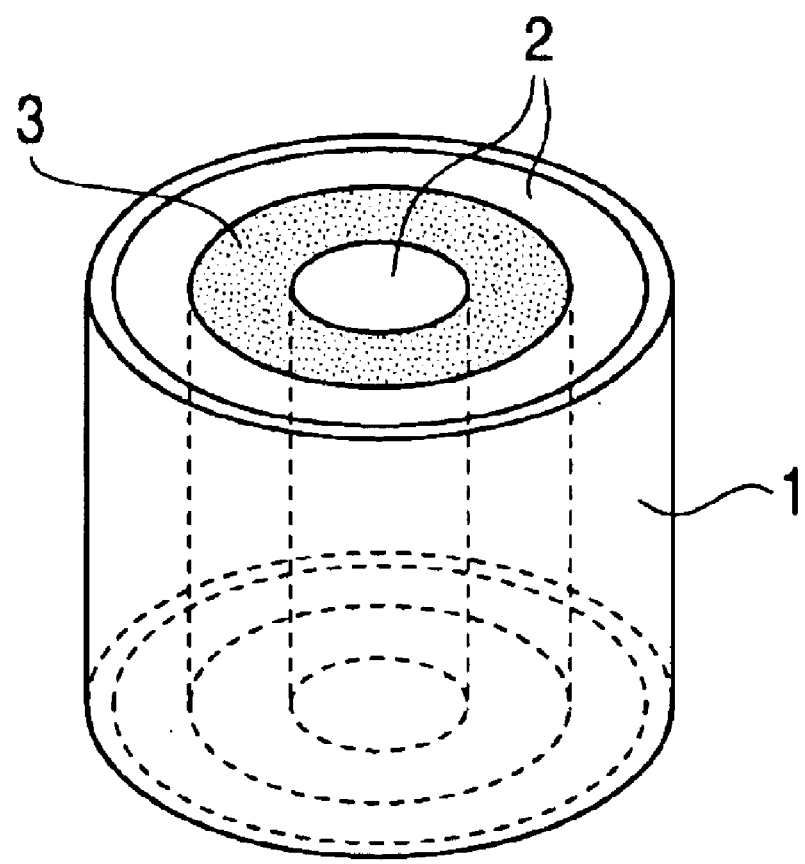

We discovered that iron powder particles comprising both iron and a magnetite phase can accelerate dehalogenation (reduction) of organic halogen compounds and thereby accelerate decontamination of the organic halogen compounds. Accordingly, the magnetite-iron based composite powder of the invention for use in remedying soil and other media is a magnetite-iron based composite powder (hereinafter also briefly referred to as "composite powder") carrying magnetite exposed in part or the whole of the surface thereof and having an average primary particle size of from about 0.01 to about 10 μm. The mechanism of the effective activity of the composite powder is not completely understood. However, without being limited to any particular theory, we believe that when the magnetite phase is exposed to the surface of the iron powder in coexistence with iron with a contact grain boundary therebetween, the surface of the exposed magnetite phase acts as a local cathode and thereby accelerates a local cell reaction. The term "primary particle size" as used herein means the particle size of a single particle or the particle size of each particle constituting an aggregate particle. The particle size is determined by observation on scanning electron microscope (SEM).

Specifically, anodes and cathodes are formed in the vicinity of the surface of the composite powder, and oxidation of iron takes place at the anodes while reduction of the organic halogen compounds proceeds at the cathodes (a local cell reaction). In a local cell reaction, electrons are transferred between the anodes and cathodes. A phase serving as the local cathode must conduct electricity. The reduction yields a dehalogenated organic compound. Thus, the polluted soil, groundwater (water), and gas (air) can be decontaminated or remedied.

Separately, the magnetite-iron based composite powder of the invention is a magnetite-iron based composite powder having an average primary particle size of from about 0.01 to about 10 μm. The use of such a magnetite-iron system can yield an electromagnetic wave absorber from a fine iron powder as a material without the problem of self-combustion.

The fine iron powder according to the invention is fine and, therefore, exhibits less decrease in permeability due to an induced current generated in an alternating magnetic field and can serve as a magnetic material in the high frequency regions up to several tens megahertzs. Accordingly, it is useful and effective as an electromagnetic wave absorber utilizing magnetic loss in the high frequency regions ranging from several megahertz to several tens of megahertz. In the regions with frequencies on the order of gigahertz, the fine iron powder acts less as a magnetic substance and more as a dielectric due to its decreased permeability. However, the permeability in this case is as low as less than or equal to about 10. By incorporating a highly dielectric material, the fine iron powder can be converted into a composite having a dielectric constant optimal to electromagnetic wave absorption.

An iron phase (excluding magnetite and other oxides) in the composite powder of the invention is preferably a pure ferrite phase, but may comprise about 50% by mass or less of an austenite phase. The iron phase preferably comprises nickel to improve corrosion resistance and magnetic properties of the composite powder. The content of nickel is preferably less than or equal to about 50% by mass and more preferably from about 5% to about 10% by mass, based on the total amount of metallic components in the composite powder. The presence of excessive nickel increases production costs of the composite powder and may deteriorate the magnetic properties thereof.

By the same token, the iron phase may comprise at least one component selected from the group consisting of cobalt (Co), chromium (Cr), manganese (Mn) and copper (Cu). The content of these elements is less than or equal to about 50% by mass based on the total amount of metallic components in the composite powder. Each of these elements can be added alone or in combination with nickel. The content of secondary impurities such as carbon and silicon other than iron and iron oxides in the composite powder is preferably less than or equal to about 1% by mass based on the total amount of the composite powder.

The composite powder of the invention has an average primary particle size of less than or equal to about 10 μm. This characteristic is important to increase the specific surface area of the composite powder. This increases its reduction power for the organic halogen compounds. If the average primary particle size exceeds about 10 μm, the specific surface area of the composite powder decreases and the reduction power thereof decreases. In contrast, if the average primary particle size is less than about 0.01 μm, the constitutive particles aggregate with each other with increasing adhesion between particles, and the resulting particles are not sufficiently dispersed into the water or soil in which the organic halogen compound is decomposed. The average primary particle size of the composite powder is preferably from about 0.1 to about 10 μm and more preferably from about 0.2 to about 0.8 μm.

When the magnetic properties of the composite powder of the invention are utilized, the composite powder may comprise aggregated particles. Such aggregated particles specifically in the form of a chain and having a thin shape exhibit increased anisotropy in shape to thereby reduce a demagnetizing field and increase permeability in the high frequency regions.

When the composite powder is used as a magnetic material, its average primary particle size should also range from about 0.01 to about 10 μm and is preferably from about 0.05 to about 3 μm and more preferably from about 0.1 to about 1 μm. If the average primary particle size exceeds about 10 μm, the resulting composite powder having a large particle size decreases in permeability and cannot be used as a magnetic material in the high frequency regions. If the average primary particle size is less than about 0.01 µm, the composite powder cannot sufficiently be dispersed into a rubber or resin and cannot satisfactorily be molded into an electromagnetic wave absorber.

The magnetite phase in the composite powder of the invention may be present either inside the powder or on the surface of the powder to thereby cover the powder. When the composite powder is used for reduction of the organic halogen compounds, the magnetite phase serving as a local cathode is preferably exposed to the surface of the composite powder. The content of the magnetite phase in the composite powder is preferably such that the ratio of diffraction intensity of the magnetite to that of α-Fe ranges from about 0.001 to about 50. The magnetite phase may not effectively accelerate reduction or may not effectively inhibit self-combustion if the ratio of diffraction intensity is excessively low. The proportion of iron exposed to the surface is decreased to thereby decrease the reduction power if the ratio of diffraction intensity is excessively high. When the composite powder is used as a magnetic material for absorption of electromagnetic waves, the absorption power decreased with a decreasing ratio of iron. The diffraction intensity ratio is more preferably from about 0.01 to about 50 and typically preferably from about 0.01 to about 5. The diffraction intensity ratio of about 0.001 corresponds to the amount of magnetite of about about 0.1% by volume, and the diffraction intensity ratio of about 5 corresponds to the amount of magnetite of about 83% by volume.

The ratio of X-ray diffraction intensity does not correspond to magnetite present in the surface alone. However, there is very little possibility that a magnetite-iron powder carries no magnetite on its surface.

In the X-ray diffraction analysis, Cu or Co is used as a X-ray source, and the obtained diffraction spectrum of the composite powder is separated into individual spectra of individual phases constituting the composite powder. In this procedure, the ratio of diffraction intensity is defined as the ratio of the maximum diffraction intensity of magnetite to that of iron, i.e., the ratio of the diffraction peak derived from the (311) planes of magnetite to the diffraction peak derived from the (110) planes of iron.

The composite powder of the invention may further comprise wustite (FeO) as an iron oxide component in addition to magnetite ($Fe_3O_4$). Parts of elements in the nonferrous inorganic compound of the ultrafine powder or small particles mentioned below may comprise an iron oxide in which part of iron in magnetite is replaced with another element.

The total amount of such iron oxides and iron-based complex oxides other than magnetite is preferably less than or equal to about 5% by mass based on the total amount of the composite powder.

The hematite ($Fe_2O_3$) based iron oxide powder (referred to as hematite based powder) for use as a raw material for the composite powder of the invention can be prepared by, for example, atomizing and roasting of an aqueous solution of an iron salt such as an iron chloride, iron sulfate or iron nitrate. Roasting is performed by atomizing the aqueous solution of the iron salt as droplets into the air and heating the atomized solution at temperatures ranging from about 600° C. to about 700° C. using a gas burner. An iron oxide powder having an average primary particle size of from about 0.01 to about 10 µm, preferably from about 0.1 to about 1 µm, can be prepared by controlling roasting conditions such as the concentration of the solution, roasting temperature and particle size of the droplets. If an iron oxide powder having an average primary particle size exceeding about 10 µm is used as the raw material of the composite powder, the resulting composite powder has a large particle size and exhibits decreased permeability and cannot be used as a magnetic material in the high frequency regions. If an iron oxide powder having an average primary particle size less than about 0.01 µm is used as the raw material, the resulting composite powder cannot sufficiently be dispersed into a rubber or a resin and cannot satisfactorily be molded into an electromagnetic wave absorber. In remediation of media, the iron oxide powder preferably has an average primary particle size of from about 0.01 to about 10 µm to ensure sufficient reduction power.

The content of nickel in hematite is preferably less than or equal to about 50% by mass based on the total amount of metal elements, since a composite powder obtained by reduction of hematite containing nickel in an amount exceeding about 50% by mass in terms of nickel cannot be used as a magnetic material in the high frequency regions. To ensure sufficient reduction power, the nickel content is also preferably less than or equal to about 50% by mass.

By the same token, the content of Co, Cr, Mn and Cu in hematite is preferably less than or equal to about 10% by mass based on the total amount of metal elements.

The material iron oxide (hematite based) powder may contain other iron based oxides less than or equal to about 40% by mass. Even if the iron oxide powder is a pure ion oxide (hematite based) powder, the resulting composite powder can keep its satisfactorily stable permeability and dielectric constant even in the high frequency regions with frequencies on the order of gigahertz and can show satisfactory reduction power.

The content of impurities such as C and Si other than iron oxides in the raw material hematite powder is preferably less than or equal to about 5% by mass based on total amount of material powders.

The composite powder of the invention tends to undergo sintering during heating and reduction. Accordingly, it is preferred that an ultrafine powder of a nonferrous inorganic compound having an average primary particle size smaller than that of the composite powder adheres to a surface of the composite powder to thereby prevent the composite powder from sintering during heating operation in its manufacture and to prevent an active surface from decreasing. The proportion of the ultrafine powder adhering to or mixed with the composite powder is preferably less than or equal to about 10% by mass and more preferably form about 1% to about 5% by mass based on total amount of material powders. If the proportion exceeds about 10% by mass, the active surface of the composite powder may be decreased.

Such ultrafine nonferrous inorganic compound powders for use herein are not specifically limited as long as they can prevent sintering of the composite powder and are preferably silicates and/or inorganic compounds including carbon. Preferred silicates are colloidal silica and fumed silica, of which colloidal silica is typically preferred in a view of adhesion of ultrafine powders. Preferred inorganic compounds including carbon are graphite and carbon black. Carbon black may be amorphous carbon black or graphitized carbon black. Each of these substances can be used alone or in combination.

If an ultrafine powder having an average primary particle size exceeding about 0.1 µm is used, constitutive particles of the ultrafine powder cannot homogeneously be dispersed into gaps among the composite powder particles, and the resulting composite powder becomes susceptible to sintering during the heating procedure in the manufacturing process. The average primary particle size of the ultrafine powder is preferably from about 0.05 to about 0.1 μm.

It is also preferred to allow the composite powder to adhere to, or be mixed with, surfaces of small particles of a nonferrous inorganic compound having an average primary particle size greater than that of the composite powder to prevent sintering and aggregation of the composite powder of the invention and to prevent the active surface from decreasing. The average primary particle size of the small particles is substantially equal to or more than about 1 μm and less than or equal to about 100 μm, preferably from about 1 to about 80 μm and typically preferably from about 3 to about 50 μm. If the average primary particle size of the small particles is less than about 1 μm, the resulting small particles aggregate with each other, and the composite powder cannot significantly adhere to or be mixed with the small particles. If it exceeds about 100 μm, the resulting composite powder mixture is hardly handled or treated in dispersion into soil or other media when the composite powder mixture is used for reduction of organic halogen compounds.

The proportion of the small particles adhered to or mixed with the composite powder is preferably from about 10% to about 80% by mass and more preferably from about 30% to about 60% by mass based on total amount of material powders. If the proportion of the small particles is less than about 10% by mass, the composite powder may aggregate. If it exceeds about 80% by mass, the proportion of the composite powder that substantially contributes to reduction of the organic halogen compound is relatively decreased to thereby decrease the reduction power for the organic halogen compound.

Such small particles of nonferrous inorganic compounds are not specifically limited as long as they can prevent aggregation and sintering and are preferably silicates and/or inorganic compounds containing carbon. Preferred silicates for use herein are silicon oxides, zeolite and pulverized powders of by-products in steel manufacture, such as fly ash powder and slag powder. Graphite is preferred as the inorganic compound including carbon as an allotrope of carbon. The graphite may be whichever of naturally occurring graphite and artificial graphite. The graphite serves to activate an interface with iron into an active site. Each of these substances can be used alone or in combination.

According to the invention, both the composite powder and ultrafine powder may adhere to the surfaces of the small particles.

It is preferred that the composite powder adheres to the ultrafine powder or to the small particles by means of bonding with solid state diffusion of atoms during the heating and reduction procedure mentioned below. The resulting composite powder mixture produced by the solid state diffusion bonding is resistant to be separated by delamination at the interface even if it is charged into a vessel or is placed underground.

Alternatively, these components may be bonded with the use of a binder.

The composite powder, ultrafine powder and small particles for use in the invention may each comprise plural particles aggregated with each other to some extent. However, the particle size of each powder should be indicated in the primary particle size. In addition, it is preferred that aggregation is limited so that about 3 to about 100 particles aggregate in the powder, since excessive aggregation is not preferred.

To enable the composite powder to maintain a stable permeability in the high frequency regions with frequencies on the order of gigahertz, a dielectric powder having a relative dielectric constant exceeding about 2.0 and preferably from about 5.0 to about 15 is preferably used as the nonferrous inorganic compound constituting the ultrafine powder and/or small particles. If the dielectric has an excessively low relative dielectric constant, the resulting composite powder mixture may exhibit deteriorated dielectric properties.

In the above case, a dielectric powder having an average primary particle size of less than or equal to about 0.1 preferably adheres to the surface of the composite powder. Alternatively, it is preferred that the composite powder is mixed with or adheres to the surface of a dielectric powder having an average primary particle size of equal to or more than about 0.1 μm and less than or equal to about 100 μm.

If the dielectric has a standard Gibbs free energy of formation equal to or more than that of hematite (−763.6 kJ/mol), it is reduced ahead of hematite and other iron oxides. Accordingly, when the hematite powder and the dielectric powder are subjected to reduction, the dielectric may be reduced into an electric conductor such as an elementary metal or an alloy to thereby lose its physical properties as a dielectric before hematite is reduced to a desired extent. In this case, the resulting composite powder mixture may not be used as a dielectric composite material in the high frequency regions. The dielectric therefore preferably has a standard Gibbs free energy of formation less than that of hematite.

The dielectric powder is preferably an oxide powder such as an aluminium oxide powder, an anatase-type titanium oxide powder and a silicon oxide powder (prepared from colloidal silica or fumed silica). Each of these powders can be used alone or in combination.

Methods for Producing Composite Powder and Composite Powder Mixture

The composite powder of the invention can be produced by heating and reducing an iron oxide mainly containing hematite ($Fe_2O_3$) and having an average primary particle size of from about 0.01 to about 10 μm in, for example, a hydrogen-containing gas at temperatures preferably from about 200° C. to about 700° C. for about 1 minute to about 3 hours.

The composite powder obtained by reduction has an average primary particle size of from about 0.01 to about 10 μm and comprises a magnetite phase exposed to part or overall surfaces of constitutive particles with the balance (excluding incidental impurities) of iron having a valency of zero ($Fe^0$). If the iron oxide is reduced at high temperatures of equal to or more than about 570° C., wustite (FeO) may be formed in addition to magnetite ($Fe_3O_4$), and part of elements in the small particles of the nonferrous inorganic compound may diffuse into the magnetite phase on the surface of the composite powder where the composite powder is in contact with the small particles to thereby yield an iron oxide in which part of iron is substituted with another element. An example of such an iron oxide in which part of iron is substituted with another element is fayalite ($Fe_2SiO_4$) which is formed during heating and reduction of the iron oxide powder when a silicate is used as the small particle nonferrous inorganic compound.

The rate of the reduction reaction is decreased if the reduction temperature is excessively low. In contrast, if it is excessively high, the relative ratio of magnetite decreases with an increasing amount of wustite, and the resulting composite powder undergoes sintering. The reduction temperature is preferably from about 200° C. to about 700° C. as mentioned above, and is more preferably from about 300° C. to about 570° C. at which reduction proceeds with a sufficient reaction rate and the two phases, α-Fe and magnetite phases, are in coexistence in equilibrium. The iron oxide powder is not sufficiently reduced and the ratio of α-Fe is low if the reduction time is excessively short. In contrast, if it is excessively long, the iron oxide powder is excessively reduced, the iron oxide in the composite powder is decreased in such an amount below the detection limit in X-ray diffraction analysis, and the resulting composite powder undergoes sintering. The reduction time is preferably from about 1 minute to about 3 hours as mentioned above and is more preferably from about 5 minutes to about 1 hour.

When carbon monoxide gas is used as the reducing gas, the reduction temperature is preferably from about 300° C. to about 900° C. If the reduction temperature is lower than about 300° C., the hematite powder may be reduced at a decreased rate to thereby deteriorate the productivity of the composite powder. In contrast, if it exceeds about 900° C., the reduced fine iron powder may undergo sintering to have a large particle size. When the carbon monoxide gas is used as the reducing gas, it may be supplied to a reduction reactor containing the hematite powder and the dielectric powder. Alternatively, coke and calcium carbonate are put into the reduction reactor containing the hematite powder and the dielectric powder, and carbon monoxide gas formed as a result of a reaction between coke and calcium carbonate can be used. The carbon monoxide gas may further comprise a gas of a reducing hydrocarbon such as methane or ethane.

The content of the magnetite phase in the composite powder can be controlled by appropriately setting the reduction temperature and reduction time in heating and reduction procedure. Specifically, the content of the magnetite phase can be increased by decreasing the reduction temperature and/or shortening the reduction time. In contrast, by increasing the reduction temperature and/or prolonging the reduction time, reduction is accelerated, and the content of the magnetite phase is decreased. As a result, a pure iron phase can be obtained in extreme cases. When the composite powder is used for reducing the organic halogen compound, the content of the magnetite phase in the composite powder is such that the ratio of the X-ray diffraction intensity of magnetite to that of α-Fe is preferably from about 0.001 to about 50 and more preferably from about 0.01 to 50 and typically preferably from about 0.5 to about 1.5. The content of the magnetite phase is not limited to the above ranges in some applications.

To achieve the above diffraction intensity ratio, it is preferred that reduction of hematite is stopped before hematite is completely reduced and yields a pure iron phase. The degree of proceeding of reduction can be determined by previously determining the dew point $Td^i$ of the material hydrogen at the reduction temperature and determining the dew point Td of exhausted hydrogen during reduction of hematite. Specifically, Td is higher than $Td^i$ due to water formed as a result of reduction until hematite is substantially completely reduced by heating (i.e., until hematite is reduced via the magnetite phase or another phase into the pure iron phase). Accordingly, the reaction maybe stopped after a predetermined time period to sufficiently proceed with reduction of hematite into magnetite and before Td becomes less than or equal to $Td^i$. This method can yield a magnetite-iron based composite powder carrying magnetite at least part of which is present on the surface of the composite powder. Magnetite herein is formed as a result of reduction of hematite.

Alternatively, the above diffraction intensity ratio can be achieved by a method in which reduction is completed when Td becomes less than or equal to $Td^i$ to yield the pure iron phase as a result of complete reduction of hematite, the hydrogen gas feed is then stopped and replaced with an inert gas, the iron particle is oxidized with an oxygen-containing gas at temperatures less than or equal to about 570° C. at which the iron and magnetite phases can be coexistent in equilibrium to thereby increase the proportion of the magnetite phase. This method can also yield a composite powder carrying magnetite at least part of which is present on the surface of the composite powder.

The composite powder of the invention can also be obtained by partially reducing hematite (preferably reducing to a state where magnetite and iron can be coexistent) and subjecting the partially reduced hematite to the above partial re-oxidation procedure. However, this method invites somewhat higher costs.

When hematite is reduced in the presence of the ultrafine nonferrous inorganic compound powder, a composite powder mixture comprising the composite powder and the ultrafine powder adhering to the surface of the composite powder as a result of solid phase diffusion bonding of atoms can be obtained. Likewise, a composite powder mixture comprising the small particles and the composite powder adhering to the surfaces of the small particles as a result of solid phase diffusion bonding of atoms can be obtained when hematite is reduced in the presence of small particles of the nonferrous inorganic compound.

A composite powder mixture comprising the small particles and the composite powder and the ultrafine powder adhering to the surfaces of the small particles can be obtained when hematite is reduced in the presence of the ultrafine nonferrous inorganic compound powder and small particles of the nonferrous inorganic compound. Naturally, the ultrafine powder and the small particles can be added one by one and be allowed to adhere sequentially.

To avoid heat generation or ignition caused by rapid oxidation, it is preferred to slightly oxidize the surface of the composite powder obtained as a result of reduction of hematite in an atmosphere of a weakly oxidizing gas having a low oxygen content.

Method for Remedying Soil and Other Media Using Iron Powder

The organic halogen compounds to which the composite powder or composite powder mixture of the invention can be applied are those containing halogen such as chlorine bound to the molecule. Such organic halogen compounds include, but are not limited to, volatile organic halogen compounds such as trichloroethylene (hereinafter may be abbreviated as TCE), tetrachloroethylene, 1,1,1-trichloroethane, 1,1,2-trichloroethane, dichloroethylenes, dichloroethanes, dichloromethane and carbon tetrachloride. In addition, PCB and dioxin, for example, can also be subjected to the method of the invention.

Such organic halogen compounds typically leak from tanks and drainage, permeate into the soil and reside there. Part of the organic halogen compounds are dissolved in the moisture in the soil and groundwater by slow degrees, while part of the remaining organic halogen compounds are gasified in the soil or air.

The organic halogen compounds are reduced with the composite powder and converted into harmless compounds such as non-halogen compounds and hydrogen halides. For example, TCE receives electrons (is reduced) on the surface of the composite powder to form unstable intermediate compounds such as chloroacetylene by beta-elimination. The intermediate compounds are ultimately decomposed to acetylene and other compounds containing no chlorine atoms. Although reduction may proceed further, harmful compounds are converted into harmless compounds in any case by initiation by reception of electrons (reduction) on the surface of the composite powder.

The composite powder of the invention is fine and carries magnetite exposed in part or over all of its surface and, therefore, it does not excessively aggregate in spite of its fineness, has a large specific surface area and exhibits high reduction power for the organic halogen compounds. The amount of the composite powder for use in remediation of polluted soil and other media can therefore be decreased.

The composite powder mixture comprising the composite powder and the ultrafine powder adhering to the composite powder more effectively prevents the composite powder particles from sintering and can, therefore, more effectively exhibit the above advantages.

The composite powder mixture comprising the small particles and the composite powder adhering to the small particles can more effectively prevent the composite powder particles from sintering and aggregation, has a significantly large specific surface area and can further effectively exhibit the above advantages. The composition has a relatively large particle size and, therefore, exhibits good workability.

The composite powder mixture comprising the small particle with the composite powder and the ultrafine powder adhering to the small particles can exhibit the advantages of the above two configurations additively.

The composite powder and the composite powder mixture of the invention can be applied to any contaminated media, including but not limited to, polluted soil or waste materials such as municipal, refinery or chemical sludges or particulates, waterway and lagoon sediments and the like, groundwater, drainage, wastewater, run-off or the like, or air according to conventional procedures. For example, the composite powder or composite powder mixture is brought into contact with the organic halogen compounds by spraying or mixing, or by injection of the composite powder or composite powder mixture or a slurry thereof, for remediation of polluted soil and/or polluted groundwater. The moisture content of the soil is preferably equal to or more than about 40% by mass. A reduction accelerating agent may be used together with the composite powder or composite powder mixture.

When the composite powder or composite powder mixture is applied to excavated polluted soil, the composite powder or composite powder mixture may also be brought into contact with the organic halogen compounds by spraying or mixing, or by injection of the composite powder or composite powder mixture or a slurry thereof, considering the moisture content, soil quality and soil pressure. The soil is preferably previously crushed to have a small particle size to bring the soil into contact with the composite powder or composite powder mixture, when the excavated soil is viscous and has a large particle size. Groundwater may be allowed to pass through a permeable layer in the ground in which the composite powder or composite powder mixture has been added.

The amount of the composite powder or composite powder mixture used relative to the amount of the soil and groundwater is appropriately determined depending on the type of decontamination or the degree of contamination of the polluted soil or groundwater. The amount of the composite powder or composite powder mixture is generally from about 0.1% to about 10% by mass and preferably from about 0.5% to about 5% by mass relative to the object to be remedied, (1) when the polluted water or groundwater is treated in situ, (2) when the polluted groundwater is pumped (extracted) for remediation and/or (3) when the polluted soil is treated by excavation.

When the composite powder or composite powder mixture of the invention is applied to polluted air, the air may be allowed to flow through a vessel filled with the composite powder or composite powder mixture to bring the air into contact with the composite powder or composite powder mixture. While the surface of the composite powder should be wet, adsorbed water is sufficient. One or more layers of water molecule layers are preferably formed on the surface of the composite powder. Relative humidity of the air is preferably equal to or more than about 50%. Fillers and a reduction accelerating agent may be filled in the vessel in addition to the composite powder or composite powder mixture.

Method for Manufacturing Electromagnetic Wave Absorber

To manufacture magnetic materials having different shapes (e.g., an electromagnetic wave absorber), a rubber and/or a resin is added to the composite powder or composite powder mixture and the resulting mixture is molded. Molding can be performed according to a conventional procedures such as pressure molding, injection molding, sheet forming or the like. When the magnetic material is manufactured by pressure molding, a molding pressure is preferably from about 5 to about 50 MPa, and a molding temperature is preferably from room temperature to a temperature about 100° C. higher than the softening temperature of the rubber and/or resin for thermoplastic resins.

Preferred resins for use herein are polyethylenes, polypropylenes, nylons, ethylene-vinyl acetate resins, and other thermoplastic resins; and epoxy resins, phenol resins, and other thermosetting resins. Preferred rubbers are urethane rubber and silicone rubber. The rubbers also include acrylic elastomers and styrene-butadiene elastomers.

The total amount of the rubber and resin is preferably from about 10 to about 80 parts by weight relative to about 100 parts by weight of the composite powder or composite powder mixture. An appropriate amount of the rubber and resin is selected within the above range depending on the dielectric constants of the rubber and resin.

By mixing with an organic solvent, the composite powder or composite powder mixture can be used as a coating or paint for the application onto inner or outer walls of buildings, vessels and cases, for example. The resulting magnetic material can yield a stable permeability and absorption capability of electromagnetic waves in the high frequency regions with frequencies on the order of several gigahertz.

The composite powder or composite powder mixture of the invention can also be applied to uses other than those mentioned above. For example, it can effectively be used as a reducing agent for reduction of nitrogen in the form of nitric acid.

EXAMPLES

The invention will be illustrated in further detail with reference to several examples and comparative examples below, which are not intended to limit the scope of the invention.

Examples 1 to 23, 32 to 43 and Comparative Examples 1 to 3

Production of Composite Powder

A series of material hematite based powders (hereinafter briefly referred to as "material hematite") was prepared by mixing hematite based powders, ultrafine powders and small particles. The composition and average primary particle size of each of the hematite based powders, and the average primary particle size of each of the ultrafine powders and small particles used herein are shown in Table 1. Each of the material hematite was subjected to reduction with hydrogen, or subjected to reduction with hydrogen followed by oxidation with oxygen, if desired, (Production Methods 1 to 4), or subjected to reduction with carbon monoxide and to reduction with hydrogen to thereby remove remaining carbon substances, if any, followed by oxidation with oxygen (Production Method 5) and thereby yielded a composite powder or a composite powder mixture. The resulting composite powder mixtures contained the composite powder and the ultrafine powder adhering to the composite powder, contained the small particles and the composite powder adhering to the small particle, or contained the small particles with the ultrafine powder and composite powder adhering to the small particles. The conditions (reduction temperature, reduction time and dew point) in reduction with hydrogen, conditions (temperature, oxygen partial pressure and oxidation time) in oxidation with oxygen and those in reduction with carbon monoxide are shown below.

The dew point in the exhausted hydrogen at the time when reduction was stopped and the X-ray diffraction intensity ratio of the composite powder after oxidation are shown in Table 1.

Production Method 1: The material hematite (50 g) was reduced in a batch furnace at 450° C. in an atmosphere of hydrogen gas. The dew point of the hydrogen gas used which had been determined at 450° C. was −30° C. A dew-point hygrometer was arranged in an exhaust pipe, and reduction was stopped before the time when the dew point decreased to −30° C. as shown in Table 1, the supply of hydrogen was stopped, and the inner atmosphere of the furnace was replaced with an inert gas. The resulting powder was cooled to room temperature, exposed to nitrogen gas containing 5% by volume of oxygen for equal to or less than 2 hours and then taken out from the furnace (partial reduction and re-oxidation).

Production Method 2: The material hematite (50 g) was reduced in a batch furnace at 550° C. in an atmosphere of hydrogen gas. The dew point of the hydrogen gas used which had been determined at 550° C. was −30° C. A dew-point hygrometer was arranged in an exhaust pipe, and reduction was stopped after the time when the dew point reached −30° C., the supply of hydrogen was stopped, and the inner atmosphere of the furnace was replaced with an inert gas. The resulting powder was then cooled to room temperature, allowed to stand in nitrogen gas containing 10% by volume of oxygen for 2 to 24 hours and then taken out from the furnace (complete reduction and re-oxidation).

Production Method 3: The material hematite (50 g) was reduced in a batch furnace at 550° C. in an atmosphere of hydrogen gas. The dew point of the hydrogen gas used which had been determined at 550° C. was +10° C. A dew-point hygrometer was arranged in an exhaust pipe, and reduction was stopped before the time when the dew point decreased to +10° C. as shown in Table 1, the supply of hydrogen was stopped, and the inner atmosphere of the furnace was replaced with an inert gas. The resulting powder was cooled to room temperature, gradually exposed to air and then taken out from the furnace (partial reduction).

Production Method 4: The material hematite (50 g) was reduced in a batch furnace at 550° C. in an atmosphere of hydrogen gas. The dew point of the hydrogen gas used which had been determined at 550° C. was +30° C. A dew-point hygrometer was arranged in an exhaust pipe, and reduction was stopped after the time when the dew point reached −30° C., the supply of hydrogen was stopped, and the inner atmosphere of the furnace was replaced with an inert gas. The resulting powder was cooled to room temperature, exposed to nitrogen gas containing 5% by volume of oxygen at 200° C. for 5 minutes to 2 hours and then taken out from the furnace (complete reduction and re-oxidation).

Production Method 5: As shown in FIG. 1, the material hematite (100 g) 3 and a mixture of a coke powder and calcium carbonate (5:1 by mass) 2 were concentrically filled in a cylindrical vessel 1. While monitoring formation of carbon monoxide gas, the vessel was heated at 850° C. in a batch furnace, and the material hematite was reduced until the formation of carbon monoxide gas completed. The reduced hematite powder was further reduced in hydrogen gas at 550° C. for 30 minutes, which hydrogen gas had a dew point of −30° C. as previously determined. While removing carbon substances, reduction was stopped after the time when the dew point of the exhausted hydrogen gas reached −30° C., the supply of hydrogen was stopped, and the inner atmosphere of the furnace was replaced with an inert gas. The resulting powder was cooled to room temperature, allowed to stand in nitrogen gas containing 5% by volume of oxygen at room temperature and then taken out from the furnace (complete reduction and re-oxidation).

Structure of Composite Powder Mixture

Each of the composite powders obtained by reduction or reduction and re-oxidation was subjected to X-ray analysis to thereby identify constitutional phases. The diffraction intensity ratios of maximum peaks of γ-Fe and iron oxides to that of α-Fe were determined.

The composite powder mixtures according to the examples of the invention were subjected to observation on scanning electron microscope (SEM) and it was found that the ultrafine powder and/or small particles satisfactorily adhered to the composite powder. The average primary particle size of each of the powders was determined according to the following procedure. Twenty or more exposures of fields of view on SEM were made, and based on the resulting SEM photographs, an average outer diameter of each target primary particle was defined as the particle size of the primary particle, and the average primary particle size was determined as an arithmetic mean of primary particle sizes of twenty or more particles. The term "primary particle" as used herein means a particle constituting an aggregated particle. When the particle is not an aggregated particle, it is considered as one primary particle.

Performance of Composite Powder as Reducing Agent (1) In a 100-ml glass vial were placed 50 ml of an aqueous solution containing 40 mg/L (liter) of calcium carbonate, 80 mg/L of sodium sulfite and 5 mg/L of TCE, followed by addition of 5 g of the composite powder (composite powder mixture). The vial was then sealed with butyl rubber with a fluorinated resin seal and an aluminium cap. The sealed sample was shaken in the vertical axis direction of the vial at a rotational speed of 180 rpm in a constant temperature chamber controlled at 23±2° C. The concentration of the TCE gas stored in the head space of the vial was analyzed with a gas detector tube at a predetermined time interval after initiation of shaking to determine the concentration of TCE in water. The vial once opened was not used for analysis thereafter.

The TCE concentration in water was measured, and the shaking time (reaction time) and the TCE concentration were plotted along the horizontal and vertical axes, respectively. The reduction power of the sample composite powder was determined as the time (hr) at which the TCE concentration reached half the initial concentration. The results are shown in Table 1.

(2) An aqueous solution of TCE was added to 40 g of a loam layer soil and thereby yielded soil polluted with 100 mg/kg of TCE. A sample composite powder was then mixed with the polluted soil in an amount of 1% by mass. The resulting soil was sealed in a 120-ml glass vial. The vial was then stored in a constant temperature chamber controlled at 23±2° C. The concentration of the TCE gas stored in the head space of the vial was analyzed with gas chromatography/mass spectrometer at a predetermined time interval after initiation of storage. In this procedure, the ratio of the TCE concentration of the soil added with the composite powder to that of soil without the composite powder was defined as the TCE residual ratio, and the residual ratio 3 days into the storage (reaction) was defined as the reduction power of the sample composite powder.

TABLE 1-1

| | Material powder | | | Ultrafine powder | | | Small particles | | |
|---|---|---|---|---|---|---|---|---|---|
| | Type** | Average primary particle size (μm) | Compositional ratio (% by mass) | Type | Average primary particle size (μm) | Compositional ratio (% by mass) | Type | Average primary particle size (μm) | Compositional ratio (% by mass) |
| Comparative Example 1 | atomized iron powder | 75 | 100 | — | — | — | — | — | — |
| Comparative Example 2 | magnetite for toner | 0.3 | 100 | — | — | — | — | — | — |
| Comparative Example 3 | hematite | 0.3 | 100 | — | — | — | — | — | — |
| Example 1 | hematite | 0.6 | 100 | — | — | — | — | — | — |
| Example 2 | hematite | 0.05 | 100 | — | — | — | — | — | — |
| Example 3 | hematite | 0.6 | 100 | — | — | — | — | — | — |
| Example 4 | hematite | 0.3 | 95 | colloidal silica | 0.02 | 5 | — | — | — |
| Example 5 | hematite | 0.3 | 95 | colloidal silica | 0.02 | 5 | — | — | — |
| Example 6 | hematite | 0.3 | 98 | carbon black | 0.01 | 2 | — | — | — |
| Example 7 | hematite | 6.3 | 98 | carbon black | 0.01 | 2 | — | — | — |
| Example 8 | hematite | 0.3 | 98 | graphitized carbon black | 0.02 | 2 | — | — | — |
| Example 9 | hematite | 0.3 | 98 | graphitized carbon black | 0.02 | 2 | — | — | — |
| Example 10 | hematite | 0.3 | 94 | colloidal silica carbon black | 0.02 0.01 | 5 1 | — | — | — |
| Example 11 | hematite | 0.3 | 94 | colloidal silca carbon black | 0.02 0.01 | 5 1 | — | — | — |
| Example 12 | hematite | 0.4 | 99 | — | — | — | silica | 25 | 1 |
| Example 13 | hematite | 0.4 | 99 | — | — | — | silica | 25 | 1 |
| Example 14 | hematite | 0.3 | 90 | — | — | — | natural graphite | 5 | 10 |
| Example 15 | hematite | 2.1 | 90 | — | — | — | natural graphite | 5 | 10 |
| Example 16 | hematite | 0.3 | 70 | colloidal silica | 0.02 | 5 | natural graphite | 30 | 25 |
| Example 17 | hematite | 0.3 | 70 | colloidal silica | 0.02 | 5 | natural graphite | 30 | 25 |
| Example 18 | hematite | 0.3 | 19 | colloidal silica graphitized carbon black | 0.02 0.02 | 5 0.5 | zeolite | 80 | 80 |
| Example 19 | hematite | 0.3 | 19 | colloidal silica graphitized carbon black | 0 02 0.02 | 0.5 0.5 | zeolite | 80 | 80 |
| Example 20 | hematite | 0.3 | 35 | colloidal silica graphitized carbon black | 0.02 0.02 | 4.5 0.5 | zeolite natural graphite | 80 50 | 30 60 |
| Example 21 | hematite | 8.3 | 35 | colloidal silica graphitized carbon black | 0.02 0.02 | 4.5 0.5 | zeolite natural graphite | 80 50 | 30 60 |
| Example 22 | 15% Ni-hematite | 0.6 | 95 | colloidal silica | 0.02 | 5 | — | — | — |
| Example 23 | hematite | 0.5 | 40 | — | — | — | zeolite | 80 | 60 |

| | Production method of composite powder | Oxidation Dew point at termination of reduction (° C.) | time of composite powder (hr) | X-ray diffraction intensity ratio of composite powder* | | | | | TCE decomposition Half-time in aqueous solution (hr) | Residual ratio (%) |
|---|---|---|---|---|---|---|---|---|---|---|
| | | | | α-Fe | γ-Fe | Magnetite | Fayalite | Wustite | | |
| Comparative Example 1 | — | — | — | 1.0 | 0 | 0 | 0 | 0 | 70 | 50 |
| Comparative Example 2 | — | — | — | 0 | 0 | All*** | 0 | 0 | >500 hr | 100 |

TABLE 1-1-continued

| | | | | | | | | | | |
|---|---|---|---|---|---|---|---|---|---|---|
| Comparative Example 3 | 2 | −30 | 0 | 1.0 | 0 | 0 | 0 | 0 | >100 hr | 80 |
| Example 1 | 2 | −30 | 12 | 1.0 | 0 | 0.02 | 0 | 0 | 20 | 5 |
| Example 2 | 1 | 20 | 0 | 1.0 | | 1.1 | 0 | 0 | 6 | 5 |
| Example 3 | 1 | 60 | 0 | 1.0 | 0 | 9.0 | 0 | 0 | 36 | 5 |
| Example 4 | 2 | −30 | 6 | 1.0 | 0 | 0.02 | 0.01 | 0 | 32 | 3 |
| Example 5 | 1 | 0 | 0 | 1.0 | 0 | 0.7 | 0.01 | 0 | 8 | 2 |
| Example 6 | 2 | −30 | 12 | 1.0 | 0 | 2.6 | 0 | 0 | 24 | 6 |
| Example 7 | 1 | 60 | 0 | 1.0 | 0 | 8.1 | 0 | 0 | 38 | 5 |
| Example 8 | 2 | −30 | 2 | 1.0 | 0 | 0.06 | 0 | 0 | 26 | 5 |
| Example 9 | 1 | 60 | 2 | 1.0 | 0 | 0.55 | 0 | 0 | 16 | 2 |
| Example 10 | 2 | −30 | 24 | 1.0 | 0 | 1.10 | 0.01 | 0 | 11 | 5 |
| Example 11 | 1 | 30 | 1 | 1.0 | 0 | 9.0 | 0.01 | 0 | 34 | 5 |
| Example 12 | 4 | −30 | 1 | 1.0 | 0 | 2.1 | 0.01 | 0 | 16 | 5 |
| Example 13 | 1 | 25 | 2 | 1.0 | 0 | 5.3 | 0.01 | 0 | 23 | 2 |
| Example 14 | 2 | −30 | 12 | 1.0 | 0 | 1.8 | 0 | 0 | 29 | 2 |
| Example 15 | 1 | 25 | 2 | 1.0 | 0 | 6.3 | 0 | 0 | 37 | 3 |
| Example 16 | 4 | −30 | 5 min | 1.0 | 0 | 0.95 | 0 | 0 | 21 | 2 |
| Example 17 | 3 | 15 | 0 | 1.0 | 0 | 2.0 | 1 | 0 | 16 | 2 |
| Example 18 | 4 | −30 | 0.5 | 1.0 | 0 | 0.90 | 0.03 | 0 | 25 | 5 |
| Example 19 | 3 | 21 | 0 | 1.0 | 0 | 0.50 | 0.01 | 0 | 39 | 5 |
| Example 20 | 5 | −30 | 2.0 | 1.0 | 0 | 3.10 | 0.02 | 0 | 45 | 5 |
| Example 21 | 3 | 40 | 0 | 1.0 | 0 | 8.0 | 0.01 | 0 | 50 | 6 |
| Example 22 | 1 | 40 | 2 | 1.0 | 1.0 | 21.0 | 0.01 | 0 | 22 | 5 |
| Example 23 | 3 | 20 | 0 | 1.0 | 0 | 1.6 | 0.05 | 0 | 31 | 5 |

*X-ray diffraction intensity ratio is the ratio to X-ray diffraction intensity of α-Fe
**hematite = $Fe_2O_3$
***pure magnetite

TABLE 1-2

| | Material powder | | | Ultrafine powder | | | Small particles | | |
|---|---|---|---|---|---|---|---|---|---|
| | Type | Average primary particle size (μm) | Compositional ratio (% by mass) | Type | Average primary particle size (μm) | Compositional ratio (% by mass) | Type | Average primary particle size (μm) | Compositional ratio (% by mass) |
| Example 32 | $(Ni_{0.05}Fe_{0.95})_2O_3$ | 0.4 | 100 | | | | | | |
| Example 33 | $(Ni_{0.1}Fe_{0.9})_2O_3$ | 0.4 | 100 | | | | | | |
| Example 34 | $(Ni_{0.05}Fe_{0.95})_2O_3$ | 0.4 | 99 | | | | silica | 25 | 1 |
| Example 35 | $(Ni_{0.07}Fe_{0.93})_2O_3$ | 0.4 | 80 | colloidal silica | 0.02 | 15 | natural graphite | 5 | 5 |
| Example 36 | $(Co_{0.3}Fe_{0.7})_2O_3$ | 0.4 | 100 | | | | | | |
| Example 37 | $(Cr_{0.03}Fe_{0.97})_2O_3$ | 0.4 | 95 | carbon black | 0.01 | 5 | | | |
| Example 38 | $(Mn_{0.02}Fe_{0.98})_2O_3$ | 0.4 | 95 | | | | natural graphite | 18 | 25 |
| Example 39 | $(Cu_{0.01}Fe_{0.99})_2O_3$ | 0.4 | 70 | carbon black | 0.01 | 5 | silica | 25 | 1 |
| Example 40 | $(Mn_{0.02}Ni_{0.07}Fe_{0.91})_2O_3$ | 0.5 | 85 | colloidal silica | 0.02 | 15 | | | |
| Example 41 | $(Co_{0.3}Cr_{0.01}Fe_{0.69})_2O_3$ | 0.5 | 94 | carbon black | 0.01 | 5 | silica | 20 | 1 |
| Example 42 | $(Mn_{0.01}Cu_{0.01}Fe_{0.98})_2O_3$ | 0.5 | 75 | | | | natural graphite | 18 | 25 |
| Example 43 | $(Ni_{0.1}Co_{0.3}Cr_{0.01}Fe_{0.6})_2O_3$ | 0.5 | 100 | | | | | | |

| | | Oxidation | | | | | | TCE decomposition | |
|---|---|---|---|---|---|---|---|---|---|
| | Production method of composite powder | Dew point at termination of reduction (° C.) | time of composite powder (hr) | X-ray diffraction intensity ratio of composite powder* | | | | Half-time in aqueous solution (hr) | Residual ratio (%) |
| | | | | α-Fe | γ-Fe | Magnetite | Fayalite | Wustite | | |
| Example 32 | 4 | −10 | 2 | 1 | 0.00 | 0.01 | 0.00 | 0 | 25 | 5 |
| Example 33 | 2 | −30 | 6 | 1 | 0.15 | 0.02 | 0.00 | 0 | 30 | 7 |
| Example 34 | 1 | 10 | 2 | 1 | 0.00 | 0.03 | 0.03 | 0 | 28 | 6 |
| Example 35 | 1 | 10 | 2 | 1 | 0.05 | 0.02 | 0.00 | 0 | 28 | 8 |

TABLE 1-2-continued

| Example 36 | 2 | -30 | 6 | 1 | 0.00 | 0.02 | 0.04 | 0 | 29 | 5 |
| Example 37 | 1 | 20 | 2 | 1 | 0.00 | 0.04 | 0.00 | 0 | 31 | 10 |
| Example 38 | 1 | -10 | 2 | 1 | 0.00 | 0.02 | 0.00 | 0 | 33 | 9 |
| Example 39 | 4 | -20 | 0.5 | 1 | 0.00 | 0.02 | 0.03 | 0 | 32 | 9 |
| Example 40 | 1 | -20 | 2 | 1 | 0.32 | 0.02 | 0.03 | 0 | 29 | 7 |
| Example 41 | 3 | 15 | 0 | 1 | 0.00 | 0.03 | 0.03 | 0 | 18 | 6 |
| Example 42 | 2 | -30 | 12 | 1 | 0.00 | 0.02 | 0.00 | 0 | 31 | 9 |
| Example 43 | 1 | -10 | 2 | 1 | 0.12 | 0.03 | 0.00 | 0 | 32 | 10 |

*X-ray diffraction intensity ratio is the ratio to X-ray diffraction intensity of α-Fe Example 24 and Comparative Example 4
Production of Composite Powder Hematite having an average primary particle size of 0.3 μm was reduced in a tube furnace at 550° C. in an atmosphere of hydrogen gas having a dew point of −40° C. During reduction, the dew point in the tube furnace was determined with a dew point hygrometer to thereby determine changes in the amount of water formed. The dew point once elevated due to the water formed as a result of reduction of hematite, but converged on a temperature of −40° C. upon the completion of the reaction. Accordingly, the time when the dew point converged on a temperature of −40° C. was considered as the completion of the reaction. After completion of the reaction, the furnace was cooled to room temperature, the inner atmosphere was replaced with nitrogen gas, and again replaced with nitrogen gas containing 5% by volume of oxygen. Thus, the surface of the obtained metal powder was slightly oxidized to form magnetite and thereby yielded a composite powder.

Performance of Composite Powder as Electromagnetic Wave Absorber

The above-prepared composite powder had an average primary particle size of 0.55 μm as determined by air-permeametry. The composite powder was subjected to X-ray diffraction pattern analysis to verify that the composite powder contained 0.2% by volume of magnetite with the balance of a pure α-Fe phase where the ratio of the intensity of magnetite to that of α-Fe was 0.002. The magnetization of the composite powder was determined at 800 kA/m with a vibrating sample magnetometer.

To the composite powder were added 1.25% by mass of an epoxy resin and 0.25% by mass of zinc stearate, and the resulting mixture was molded at room temperature at a pressure of 686 MPa into a ring having an outer diameter of 12 mm, an inner diameter of 8 mm and a thickness of 2 mm. The constitutive resin was then cured by heating at 180° C. and thereby yielded a magnetic powder core (Example 24). The ratio of permeability to initial permeability of the magnetic powder core was determined as a complex impedance measured with an impedance analyzer at frequencies from 10 kHz to 1 GHz. The ratio of permeability to initial permeability at 10 kHz ($\mu_{ri}/\mu_o$:10 k) was measured, and the frequency at which this ratio was decreased to eight tenth (critical frequency $f_{cr}$) was determined. The results are shown in Table 2.

As a comparison, a commercially available carbonyl iron powder having an average particle size of 3.00 μm was molded in the same manner as above to yield a magnetic powder core (Comparative Example 4) and the properties thereof were determined. The results are also shown in Table 2.

The magnetization of each of the powders was near to that of pure iron (2.1580 Wb/m²) to verify that the powders were magnetically pure iron. When the powders were molded into magnetic powder cores, the magnetic powder core according to Example 24 comprising the composite powder of the invention showed a slightly low ratio of permeability to initial permeability, but a higher critical frequency as determined at the same density than the magnetic powder core according to Comparative Example 4 comprising the carbonyl iron powder. This verified that the magnetic powder core of Example 24 can stably keep the ratio of permeability to initial permeability even in the high frequency regions.

TABLE 2

| | Properties of composite powder | | | Characteristics of magnetic powder core | |
|---|---|---|---|---|---|
| | Average primary particle size (μm) | σ800 k (Wb/m²) | Density (Mg/m³) | Ratio of permeability relative to initial permeability $\mu_{ri}/\mu_o$:10 k | $f_{cr}$ (MHz) |
| Example 24 | 0.55 | 2.13 | 6.54 | 35 | 55 |
| Comparative Example 4 | 3.00 | 2.14 | 6.56 | 40 | 32 |

Examples 25 to 31 and 44 to 48
Production of Composite Powder (Mixture)

A series of powder mixtures was obtained by mixing hematite powders with nonferrous inorganic compound (dielectric) powders in compositional ratios indicated in Table 3. The compositions and average primary particle sizes of the hematite powders and the nonferrous inorganic compound powders are shown in Table 3. The powder mixtures were reduced with hydrogen gas in a box furnace under conditions shown in Table 3, cooled to room temperature and then oxidized in nitrogen gas with 5% by volume of oxygen gas for equal to or less than 12 hours.

The obtained powders were subjected to X-ray diffraction analysis, and the volume ratios of individual phases were determined based on the ratios of the maximum peaks of the individual phases. The results are shown in Table 3. Any of the composite powders mainly contained α-Fe, magnetite and nonferrous oxides, and a very small part of the nonferrous oxides were converted into iron compounds. This verifies that, by the reduction procedure, almost none of the nonferrous oxides were reduced, but hematite was selectively reduced. Next, while distinguishing iron powder particles from nonferrous powder particles by scanning electron microscopy-energy dispersive X-ray spectroscopy (SEM-EDX), the average primary particle size of each powder was determined. The results are shown in Table 3.

Performance of Composite Powder (Mixture) as Electromagnetic Wave Absorber

Each of the above-prepared composite powders was mixed with a resin or rubber such as ethylene-vinyl acetate resin in a ratio shown in Table 3, and the mixture was molded into a sheet of 3 mm thick. The electromagnetic wave absorption of the sheet was determined at frequencies from 1.8 to 18 GHz.

Table 3 shows that the sheets according to Examples 25 to 31 and 44 to 48 could satisfactorily absorb the electromagnetic waves.

TABLE 3-1

| | Hematite ($Fe_2O_3$) | | Nonferrous inorganic compound | | | | | |
|---|---|---|---|---|---|---|---|---|
| | Average primary particle size ($\mu$m) | Compositional ratio (% by mass) | Type | Average primary particle size ($\mu$m) | Compositional ratio (% by mass) | Reduction time (hr) | Reduction temperature (° C.) | Oxidation time of composite powder (hr) |
| Example 25 | 0.5 | 100 | — | — | 0 | 2.0 | 550 | 12 |
| Example 26 | 1.1 | 70 | titanium oxide** | 0.2 | 30 | 2.0 | 550 | 0 |
| Example 27 | 1.1 | 50 | titanium oxide** | 0.2 | 50 | 2.0 | 550 | 0 |
| Example 28 | 1.1 | 10 | titanium oxide** | 0.2 | 90 | 1.5 | 550 | 6 |
| Example 29 | 0.6 | 50 | titanium oxide** | 0.2 | 50 | 1.5 | 550 | 0 |
| Example 30 | 2.3 | 50 | aluminium oxide*** | 0.1 | 50 | 1.5 | 550 | 12 |
| Example 31 | 0.8 | 50 | silicon oxide**** | 0.15 | 50 | 1.5 | 550 | 0 |

| | Content in composite powder as determined by X-ray diffraction (% by volume) | | | | | Resin/rubber | | |
|---|---|---|---|---|---|---|---|---|
| | $\alpha$-Fe | Magnetite* | Wustite | By-produced oxide | Nonferrous inorganic oxide | Type | Amount relative to composite powder (% by weight in sheet) | Electromagnetic wave absorption***** |
| Example 25 | 99.8 | 0.2 | 0.1 | — | — | ethylene-vinyl acetate resin | 40 | good |
| Example 26 | 65.3 | 0.2 | 0 | — | titanium oxide** 35.5 | ethylene-vinyl acetate resin | 20 | good |
| Example 27 | 45.5 | 0.3 | 0 | $Fe_2TiO_3$ 0.2 | titanium oxide** 54 | ethylene-vinyl acetate resin | 30 | good |
| Example 28 | 45.5 | 0.3 | 0 | $Fe_2TiO_3$ 0.2 | titanium oxide** 73.3 | ethylene-vinyl acetate resin | 50 | good |
| Example 29 | 43.7 | 0.7 | 0 | $Fe_2TiO_3$ 0.5 | titanium oxide** 55.1 | ethylene-vinyl acetate resin | 90 | good |
| Example 30 | 46.1 | 0.8 | 0 | $Fe_2AlO_3$ 0.1 | aluminium oxide*** 53 | ethylene-vinyl acetate resin | 80 | good |
| Example 31 | 45.3 | 0.9 | 0 | $Fe_2SiO_3$ 0.1 | silicon oxide**** 53.7 | ethylene-vinyl acetate resin | 80 | good |

*X-ray diffraction intensity ratio of magnetite = (volume percentage of magnetite)/(volume percentage of $\alpha$-Fe)(within the range shown in Table 3)
**Titanium oxide: anatase-type,: relative dielectric constant: 48.0, standard Gibbs free energy of formation of oxide ($\Delta G^0 f$): −887.6 kJ/mol
*oxide Aluminium oxide: relative dielectric constant: 9.34 to 11.54 (varying depending on direction of electric field to the crystal axis), standard Gibbs free energy of formation of oxide ($\Delta G^0 f$): −1581.9 kJ/mol
****Silicon oxide: relative dielectric constant: 4.27 to 4.68 (varying depending on direction of electric field to the crystal axis), standard Gibbs free energy of formation of oxide ($\Delta G^0 f$): −856.5 kJ/mol
Standard Gibbs free energy of formation of hematite ($Fe_2O_3$) ($\Delta G^0 f$): −763.6 kJ/mol
$\Delta G^0 f$: as determined under standard condition at 298 K
***** good: reflection ratio is equal to or less than −5 dB

TABLE 3-2

| | Hematite ($Fe_2O_3$) | | | Nonferrous inorganic compound | | | | |
|---|---|---|---|---|---|---|---|---|
| | Nonferrous component in metal (ratio based on total amount of metal component) | Average primary particle size ($\mu$m) | Compositional ratio (% by mass) | Type | Average primary particle size ($\mu$m) | Compositional ratio (% by mass) | Reduction time (hr) | Reduction temperature (° C.) | Oxidation time of composite powder (hr) |
| Example 44 | 5% Ni | 0.5 | 10 | titanium oxide** | 0.2 | 90 | 1 | 500 | 1 |
| Example 45 | 25% Co | 0.6 | 20 | titanium oxide** | 0.2 | 80 | 1 | 500 | 1 |
| Example 46 | 6% Mn | 0.6 | 45 | silicon oxide**** | 0.1 | 55 | 1.5 | 550 | 1 |

TABLE 3-2-continued

| | | | | | | | | | |
|---|---|---|---|---|---|---|---|---|---|
| Example 47 | 2% Cr-1% Cu | 0.6 | 55 | aluminium oxide*** | 0.1 | 45 | 2 | 550 | 1 |
| Example 48 | 1% Ni-30% Co-1% Mn | 0.5 | 50 | aluminium oxide*** | 0.1 | 50 | 2 | 550 | 1 |

| | Content in composite powder as determined by X-ray diffraction (% by volume) | | | | | | Resin/rubber | | |
|---|---|---|---|---|---|---|---|---|---|
| | | | | | | | | Amount relative to composite | |
| | α-Fe | γ-Fe | Magnetite* | Wustite | By-produced oxide | Nonferrous inorganic oxide | Type | powder (% by weight in sheet) | Electromagnetic wave absorption***** |
| Example 44 | 7.1 | 0.6 | 0.2 | 0.1 | $Fe_2TiO_3$ 3.5 | titanium oxide 88.5 | urethane rubber | 70 | good |
| Example 45 | 18.2 | 0.3 | 0.1 | 0.1 | $Fe_2TiO_3$ 2.1 | titanium oxide 78.3 | urethane rubber | 80 | good |
| Example 46 | 43.4 | 0.5 | 0.1 | 0.1 | $Fe_2SiO_3$ 3.0 | silicon oxide 53.0 | urethane rubber | 70 | good |
| Example 47 | 53.9 | 0.3 | 0.1 | 0.1 | $Fe_2AlO_3$ 2.6 | aluminium oxide 43 | urethane rubber | 50 | good |
| Example 48 | 48.8 | 0.3 | 0.1 | 0.1 | $Fe_2AlO_3$ 2.3 | aluminium oxide 48 | urethane rubber | 40 | good |

*X-ray diffraction intensity ratio of magnetite = (volume percentage of magnetite)/(volume percentage of α-Fe)(within the range shown in Table 3)
**Titanium oxide: anatase-type,: relative dielectric constant: 48.0, standard Gibbs free energy of formation of oxide ($\Delta G^0 f$): −887.6 kJ/mol
***Aluminium oxide: relative dielectric constant: 9.34 to 11.54 (varying depending on direction of electric field to the crystal axis), standard Gibbs free energy of formation of oxide ($\Delta G^0 f$): −1581.9 kJ/mol
****Silicon oxide: relative dielectric constant: −4.27 to 4.68 (varying depending on direction of electric field to the crystal axis), standard Gibbs free energy of formation of oxide ($\Delta G^0 f$): −856.5 kJ/mol
Standard Gibbs free energy of formation of hematite ($Fe_2O_3$) ($\Delta G^0 f$): −763.6 kJ/mol
$\Delta G^0 f$: as determined under standard condition at 298 K
*****good: reflection ratio is equal to or less than −5 dB Other embodiments and variations will be apparent to those skilled in the art, and this invention is not to be limited to the specific matters stated above.

What is claimed is:

1. A magnetite-iron based composite powder comprising magnetite and iron and having an average primary particle size of from about 0.05 to about 10 μm wherein the ratio of maximum diffraction intensity of magnetite to that of α-Fe in X-ray diffraction is from about 0.001 to about 50.

2. A magnetite-iron based composite powder comprising magnetite and iron and having an average primary particle size of from about 0.01 to about 10 μm wherein the ratio of maximum diffraction intensity of magnetite to that of α-Fe in X-ray diffraction is from about 0.001 to about 50.

3. A magnetite-iron based composite powder comprising magnetite and iron and having an average primary particle size of from about 0.01 to about 10 μm and at least one component selected from the group consisting of nickel, cobalt, chromium, manganese and copper, wherein the ratio of maximum diffraction intensity of magnetite to that of α-Fe in X-ray diffraction is from about 0.001 to about 50.

4. The magnetite-iron based composite powder according to claim 2, further comprising nickel.

5. A magnetite-iron based composite powder mixture comprising:
   the magnetite-iron based composite powder as claimed in claims 2 or 3; and
   a nonferrous inorganic compound powder.

6. The magnetite-iron based composite powder mixture according to claim 5,
   wherein an average primary particle size of the nonferrous inorganic compound powder is less than or equal to about 0.1 μm and is less than that of the magnetite-iron based composite powder, and
   wherein the nonferrous inorganic compound powder adheres to a surface of the magnetite-iron based composite powder.

7. The magnetite-iron base composite powder mixture according to claim 5,
   wherein an average primary particle size of nonferrous inorganic compound powder is greater than or equal to about 1 μm and less than or equal to about 100 μm and is greater than that of the magnetite-iron based composite powder, and
   wherein the magnetite-iron based composite powder adheres to a surface of the nonferrous inorganic compound powder.

8. The magnetite-iron based composite powder mixture according to claim 5,
   wherein the nonferrous inorganic compound powder comprises a first nonferrous inorganic compound powder and a second nonferrous inorganic compound powder,
   wherein an average primary particle size of the first nonferrous inorganic compound powder is less than or equal to about 0.1 μm,
   wherein the average primary particle size of the second nonferrous inorganic compound powder is greater than or equal to about 1 μm and less than or equal to about 100 μm and is greater than that of the magnetite-iron based composite powder, and
   wherein the magnetite-iron based composite powder and the first nonferrous inorganic compound powder adhere to a surface of the second nonferrous inorganic compound powder.

9. The magnetite-iron based composite powder according to claim 1, further comprising at least one component selected from the group consisting of nickel, cobalt, chromium, manganese and copper.

10. The magnetite-iron based composite powder as claimed in claim 1, further comprising nickel.

11. A magnetite-iron based composite powder mixture comprising:

the magnetite-iron based composite powder as claimed in any one of claims 1 and 9; and a nonferrous inorganic compound powder.

12. The magnetite-iron based composite powder mixture according to claim 11, wherein an average primary particle size of the nonferrous inorganic compound powder is less than or equal to about 0.1 μm and is less than that of the magnetite-iron based composite powder, and wherein the nonferrous inorganic compound powder adheres to a surface of the magnetite-iron based composite powder.

13. The magnetite-iron based composite powder mixture according to claim 11, wherein an average primary particle size of the nonferrous inorganic compound powder is greater than or equal to about 1 μm and less or equal to about 100 μm and is greater than that of the magnetite-iron based composite powder, and wherein the magnetite-iron based composite powder adheres to a surface of the nonferrous inorganic compound powder.

14. The magnetite-iron based composite powder mixture according to claim 11, wherein the nonferrous inorganic compound powder comprises a first nonferrous inorganic compound powder and a second nonferrous inorganic compound powder, wherein an average primary particle size of the first nonferrous inorganic compound powder is less than or equal to about 0.1 μm, wherein the average primary particle size of the second nonferrous inorganic compound powder is greater than or equal to about 1 μm and less than or equal to about 100 μm and is greater than that of the magnetite-iron based composite powder, and wherein the magnetite-iron based composite powder and the first nonferrous inorganic compound powder adhere to a surface of the second nonferrous inorganic compound powder.

* * * * *

UNITED STATES PATENT AND TRADEMARK OFFICE
CERTIFICATE OF CORRECTION

PATENT NO. : 6,827,757 B2
DATED : December 7, 2004
INVENTOR(S) : Ozaki et al.

It is certified that error appears in the above-identified patent and that said Letters Patent is hereby corrected as shown below:

Column 3,
Line 63, please change "___Fe" to -- $\alpha$-Fe --.

Signed and Sealed this

Sixth Day of September, 2005

JON W. DUDAS
*Director of the United States Patent and Trademark Office*